United States Patent
Chin et al.

(10) Patent No.: US 9,084,216 B2
(45) Date of Patent: Jul. 14, 2015

(54) METHOD AND APPARATUS FOR ENHANCEMENT OF CELL ID-BASED POSITION DETERMINATION IN TD-SCDMA MULTIMODE TERMINALS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 13/501,720

(22) PCT Filed: May 12, 2010

(86) PCT No.: PCT/US2010/034510
§ 371 (c)(1),
(2), (4) Date: Jul. 23, 2012

(87) PCT Pub. No.: WO2011/062654
PCT Pub. Date: May 26, 2011

(65) Prior Publication Data
US 2012/0275329 A1    Nov. 1, 2012

Related U.S. Application Data

(60) Provisional application No. 61/263,111, filed on Nov. 20, 2009.

(51) Int. Cl.
*H04W 64/00* (2009.01)
*G01S 5/00* (2006.01)
*G01S 5/02* (2010.01)

(52) U.S. Cl.
CPC ............. *H04W 64/00* (2013.01); *G01S 5/0036* (2013.01); *G01S 5/0252* (2013.01)

(58) Field of Classification Search
None
See application file for complete search history.

(56) References Cited

U.S. PATENT DOCUMENTS

| 8,045,996 | B2 | 10/2011 | Brunner et al. |
| 2003/0076812 | A1 | 4/2003 | Benedittis |
| 2003/0148774 | A1 | 8/2003 | Naghian et al. |
| 2004/0008646 | A1* | 1/2004 | Park et al. ...................... 370/331 |
| 2004/0170136 | A1* | 9/2004 | Woo et al. ...................... 370/320 |
| 2004/0257273 | A1* | 12/2004 | Benco et al. ................ 342/357.1 |
| 2006/0258386 | A1* | 11/2006 | Jeong et al. ................... 455/525 |
| 2007/0254673 | A1* | 11/2007 | Stenberg et al. ............ 455/456.1 |
| 2009/0131073 | A1 | 5/2009 | Carlson et al. |

(Continued)

FOREIGN PATENT DOCUMENTS

| CN | 1433645 A | 7/2003 |
| WO | 0152569 A1 | 7/2001 |

OTHER PUBLICATIONS

International Search Report and Written Opinion—PCT/US2010/034510, ISA/EPO—Aug. 17, 2010.

(Continued)

*Primary Examiner* — Gregory Sefcheck
*Assistant Examiner* — Amar Persaud
(74) *Attorney, Agent, or Firm* — Kristine U. Ekwueme (57) ABSTRACT

A method, an apparatus, and a computer program product for wireless communication are provided in which the method of wireless communication includes identifying a reference cell; selecting a plurality of candidate cells based on a criteria; determining a characteristic for the reference cell and the plurality of candidate cells; and setting a position based on the determined characteristic.

20 Claims, 9 Drawing Sheets

(56) References Cited

U.S. PATENT DOCUMENTS

| | | |
|---|---|---|
| 2009/0170510 A1* | 7/2009 | Kim .............................. 455/434 |
| 2009/0233621 A1* | 9/2009 | Rhoads et al. ............. 455/456.1 |
| 2009/0264136 A1* | 10/2009 | Ische et al. ................ 455/456.1 |
| 2011/0045840 A1* | 2/2011 | Alizadeh-Shabdiz et al. ......................... 455/456.1 |
| 2011/0117925 A1* | 5/2011 | Sampath et al. ........... 455/456.1 |
| 2011/0312339 A1* | 12/2011 | Kuningas et al. .......... 455/456.1 |

OTHER PUBLICATIONS

Taiwan Search Report—TW099115712—TIPO—Aug. 1, 2013.

* cited by examiner

METHOD AND APPARATUS FOR ENHANCEMENT OF CELL ID-BASED POSITION DETERMINATION IN TD-SCDMA MULTIMODE TERMINALS

CROSS-REFERENCE TO RELATED APPLICATIONS

This application claims the benefit of U.S. Provisional Patent Application No. 61/263,111, entitled "METHOD AND APPARATUS FOR ENHANCEMENT OF CELL ID-BASED POSITION DETERMINATION IN TD-SCDMA SYSTEMS," filed on Nov. 20, 2009, which is expressly incorporated by reference herein in its entirety.

BACKGROUND

1. Field

Aspects of the present disclosure relate generally to wireless communication systems, and more particularly, to methods and apparatus for enhancement of cell ID-based position determination in TD-SCDMA multimode terminals.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Location-based services are popular services being provided to enhance the user experience. However, to provide these services, it is desired that as accurate the location determination is as possible be achieved.

SUMMARY

In an aspect of the disclosure, a method of wireless communication is provided. The method includes identifying a reference cell; selecting a plurality of candidate cells based on a criterion; determining a characteristic associated with propagation times associated with both the reference cell and the plurality of candidate cells; and setting a position based on the determined characteristic.

In an aspect of the disclosure, an apparatus for wireless communication includes means for identifying a reference cell; means for selecting a plurality of candidate cells based on a criterion; means for determining a characteristic associated with propagation times associated with both the reference cell and the plurality of candidate cells; and means for setting a position based on the determined characteristic.

In an aspect of the disclosure, a computer program product includes a computer-readable medium including code for identifying a reference cell; selecting a plurality of candidate cells based on a criterion; determining a characteristic associated with propagation times associated with both the reference cell and the plurality of candidate cells; and setting a position based on the determined characteristic.

In an aspect of the disclosure, an apparatus for wireless communication includes a processing system. The processing system is configured to identify a reference cell; select a plurality of candidate cells based on a criterion; determine a characteristic associated with propagation times associated with both the reference cell and the plurality of candidate cells; and set a position based on the determined characteristic.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
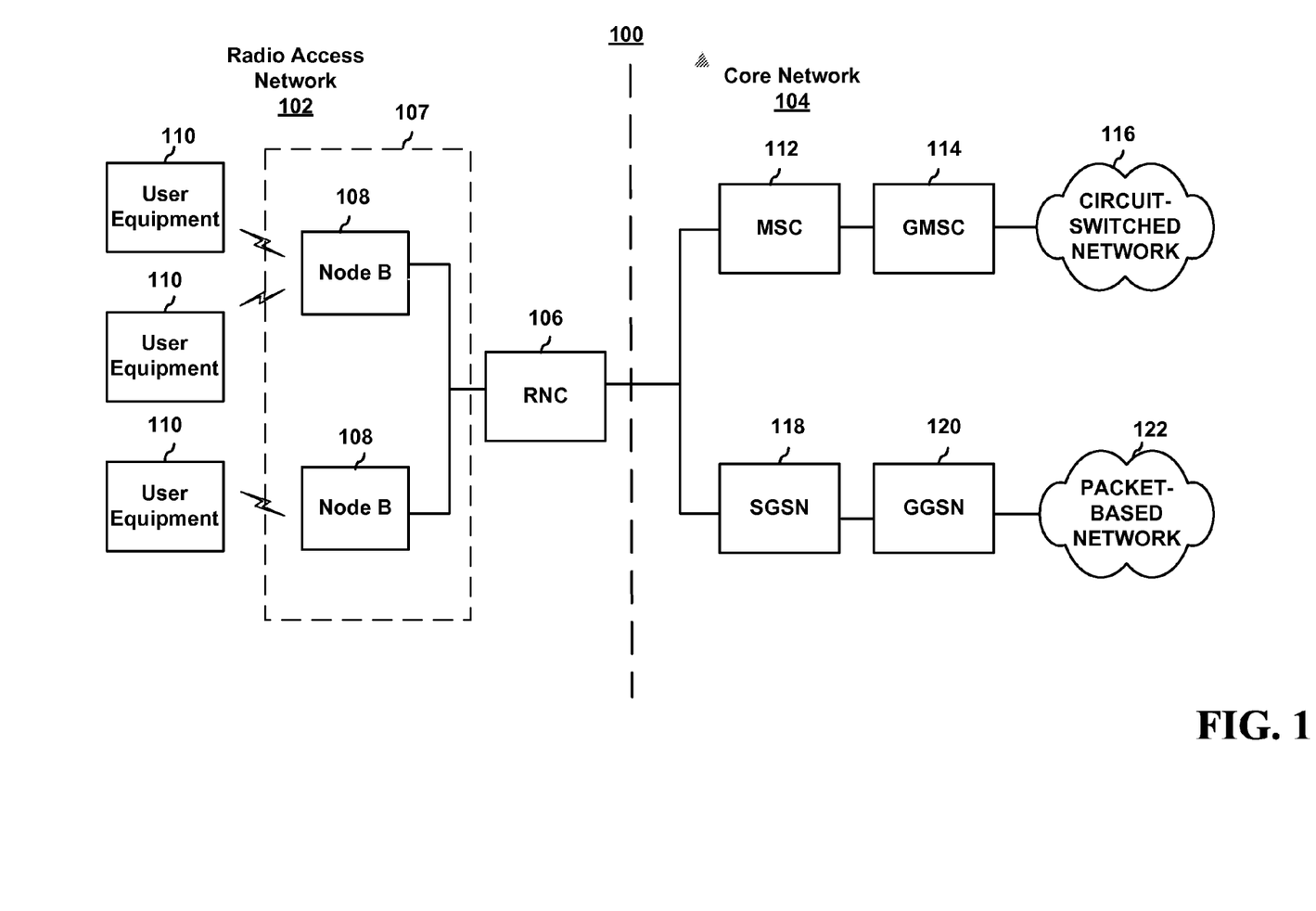
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the UL and DL between a Node B 108 and a UE 110, but divides uplink and downlink transmissions into different time slots in the carrier.

Figure 2:
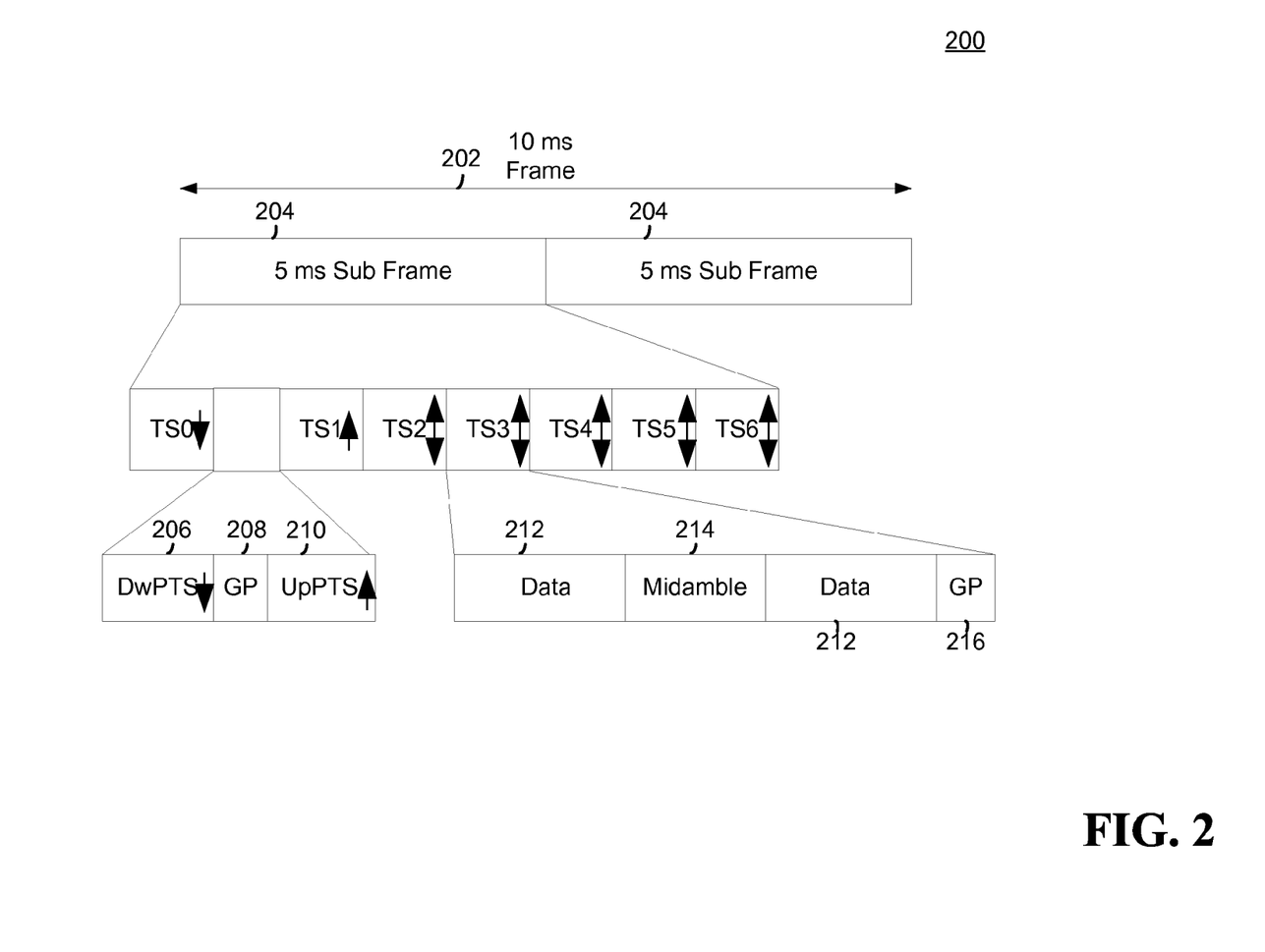
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
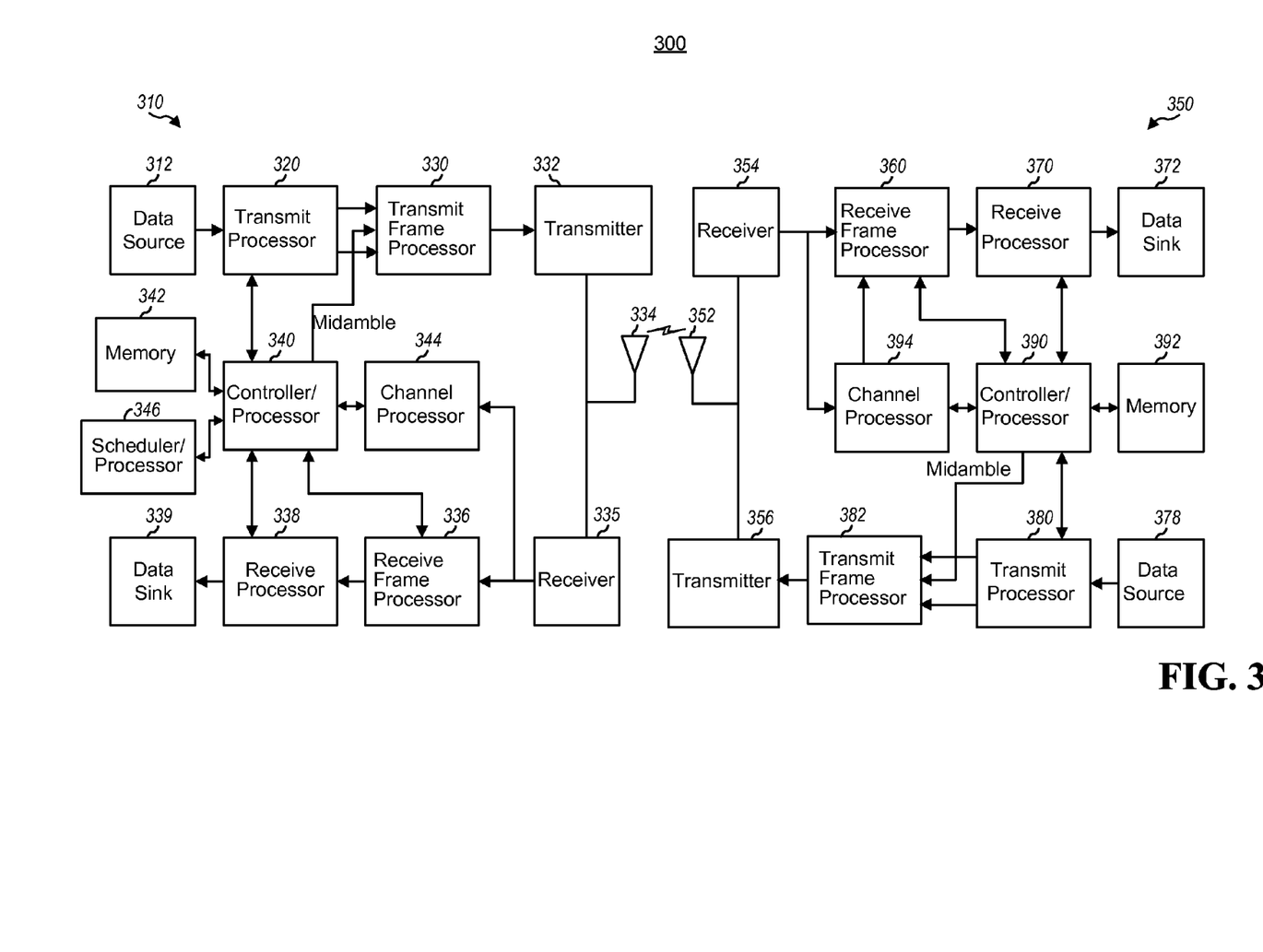
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 202 in FIG. 2, the Node B 310 may be the Node B 208 in FIG. 2, and the UE 350 may be the UE 210 in FIG. 2. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through one or more smart antenna 334. The one or more smart antenna 334 may be implemented with beam steering bidirectional adaptive antenna arrays or other similar beam technologies.

At the UE 350, a receiver 354 receives the downlink transmission through one or more antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the one or more antenna 352.

The uplink transmission is processed at the Node B 310 in a manner similar to that described in connection with the receiver function at the UE 350. A receiver 335 receives the uplink transmission through the one or more antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an ACK and/or NACK protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Figure 4:
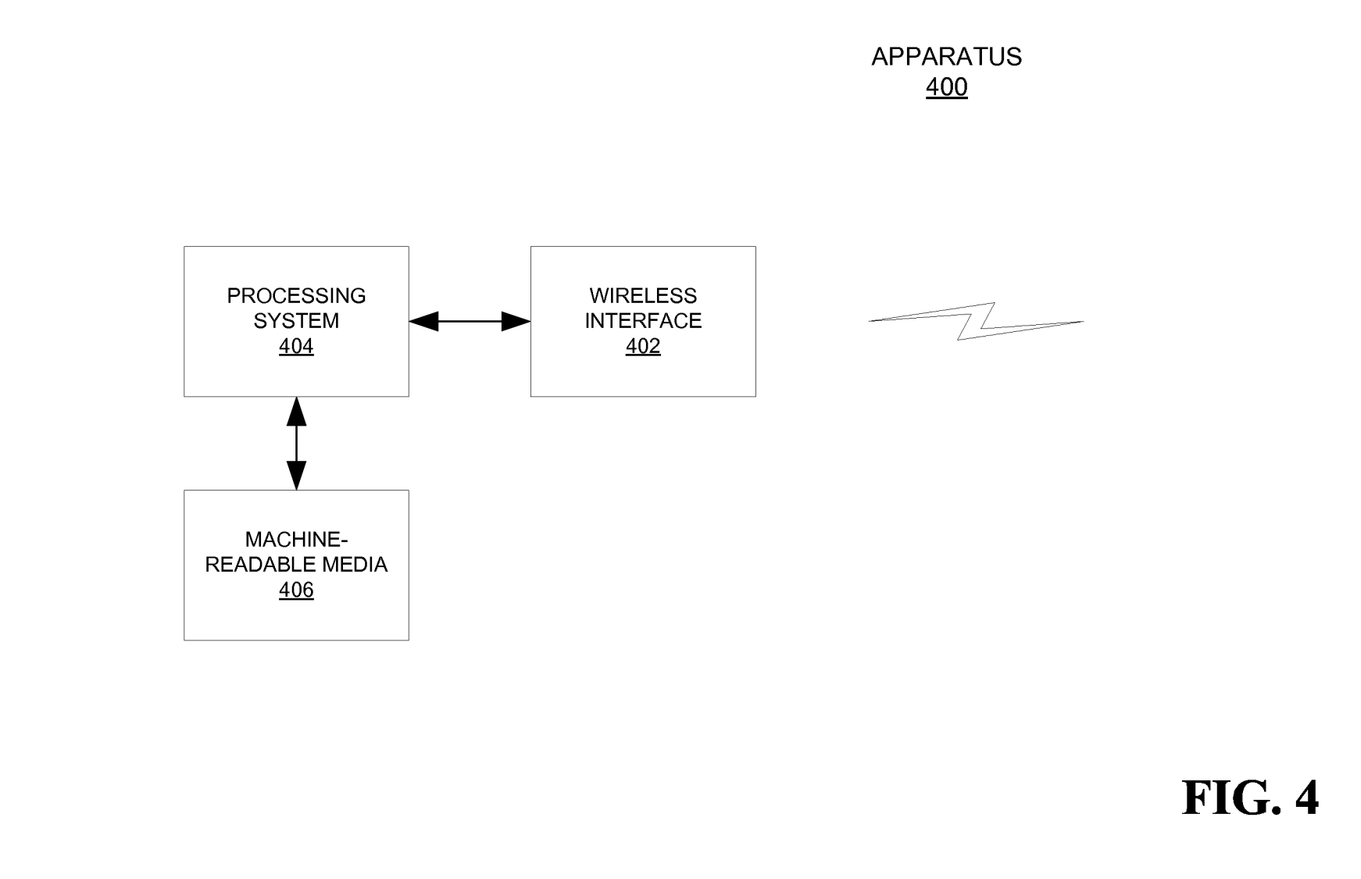
FIG. 4 is a block diagram conceptually illustrating an example of a processing system of the UE of FIG. 3.

FIG. 4 is a block diagram illustrating a configuration for an apparatus 400, which can be a UE 110. The apparatus 400 may include a wireless interface 402, a processing system 404, and machine-readable media 406. The wireless interface 402 may be integrated into the processing system 404 or distributed across multiple entities in the apparatus. The processing system 404 may be implemented with one or more processors. The one or more processors may be implemented with any combination of general-purpose microprocessors, microcontrollers, digital signal processors (DSPs), digital signal processing devices (DSPDs), field programmable gate array (FPGAs), programmable logic devices (PLDs), controllers, integrated circuits (ICs), application specific ICs (ASICs), state machines, gated logic, discrete hardware components, or any other suitable entities that can perform calculations or other manipulations of information.

The processing system 404 is coupled to machine-readable media 406 for storing software. Alternatively, the processing system 404 may itself include the machine-readable media 406. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 404 to perform the various functions described below, as well as various protocol processing functions.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, and/or data can be passed, forwarded, or transmitted using any suitable means including memory sharing, message passing, token passing, and network transmission.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

The TD-SCDMA standards provide position determination for UEs without the use of GPS receivers using three schemes:

1. Cell ID: Use the current cell to approximate the UE's position.
2. UE-assisted Observed Time Difference of Arrival (OT-DOA): The UE measures the difference in time of arrival of several cells and signals the measurement results to the network, where the network carries out the position calculation. The OTDOA uses the SFN-SFN (System Frame Number-to-System Frame Number) observed time difference between the neighbor cell and the reference cell.
3. UE-based OTDOA: The UE measures the difference in time of arrival of several cells and also carries out the position calculation. Finally, the UE signals the positioning results to the network.

The Cell ID-based method may be the simplest approach. In this approach, the Node B of the cell normally broadcasts the position information of the current Node B in the system information message. In particular, the system information block type 15.5 (SIB-15.5) includes the OTDOA assistance data for UE-based Information Elements (IE). This IE indicates the position information for the current Node B. That is, in the Ellipsoid IE, the Degree of Latitude and Degree of Longitude information for the current cell is included. Therefore, by acquiring SIB-15.5, the UE can know its approximate position.

One issue is selecting a cell to be used to determine the approximate UE location. One simple way is to choose the cell with strongest signal. For example, the strength of the signal may be determined using a Receive Signal Code Power (RSCP) of the Primary Common Control Physical Channel (P-CCPCH). However, this approach does not always yield the best result.

Figure 5:
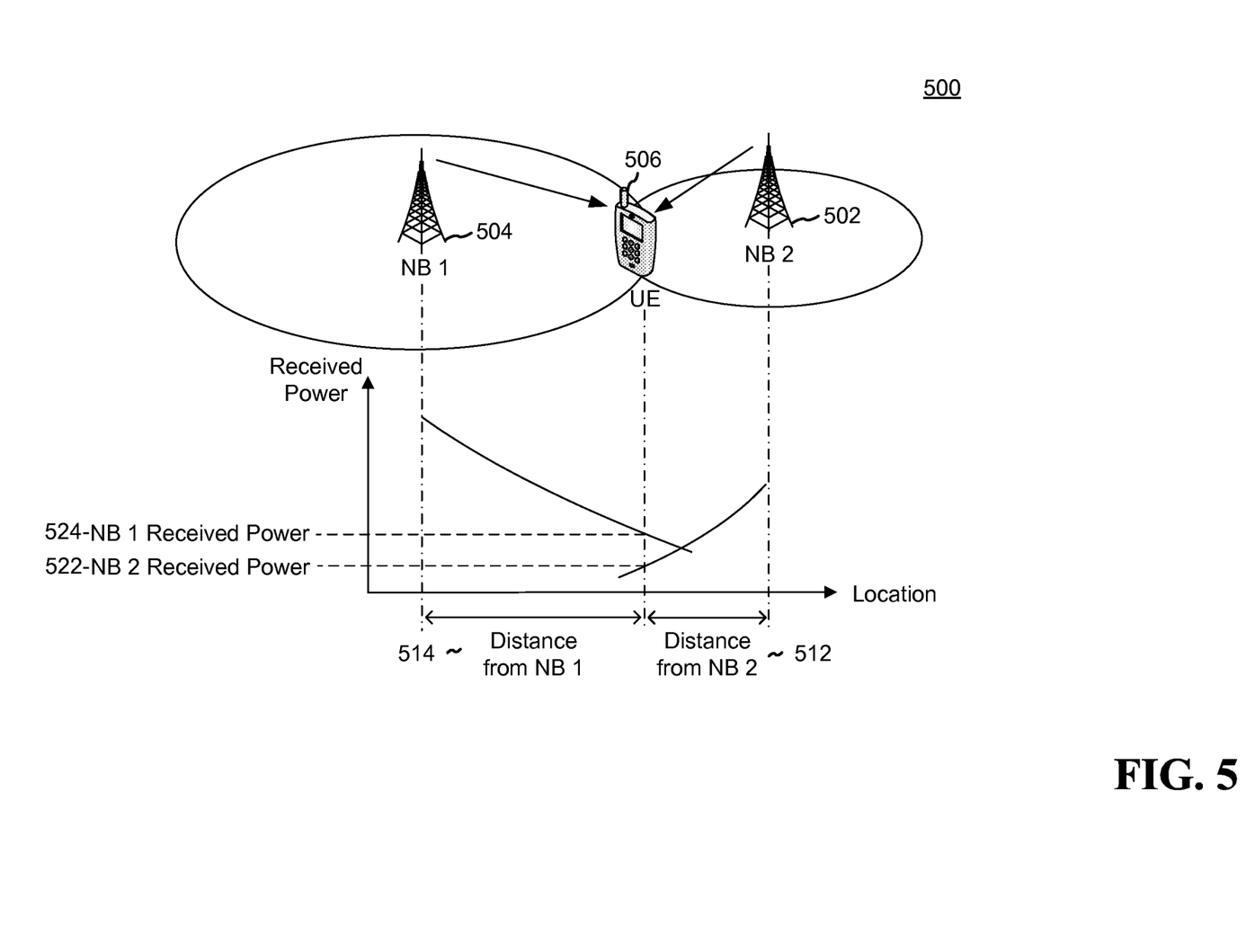
FIG. 5 is a network diagram showing a problem of relying on the strongest signal to determine a position of a user equipment (UE).

FIG. 5 illustrates the problem of relying on the strongest signal to determine the UE's position. For example, in a network 500, a Node B 1 504 has larger cell radius and transmit with higher power than a Node B 2 502 to a UE 506. The UE 506 may receive a stronger signal 524 from the Node B 1 504 than a signal 522 received from the Node B 2 502. However, the Node B 2 502 provide a better position approximation because the UE 506 is at a distance 512 to the Node B 2 502 that is closer than a distance 514 to the Node B 1 504.

In TD-SCDMA systems, all Node Bs transmit the downlink (DL) along synchronous frame boundaries. In one aspect of the disclosure, an enhancement to improve the accuracy of the Cell ID-based UE positioning is using the UE to measure received frame boundaries to determine which cell is selected to be used as a reference cell for the Cell ID-based positioning process. This present disclosure proposes approaches to choose the best cell in the Cell ID-based positioning that may more accurately indicate the UE position.

Figure 6:
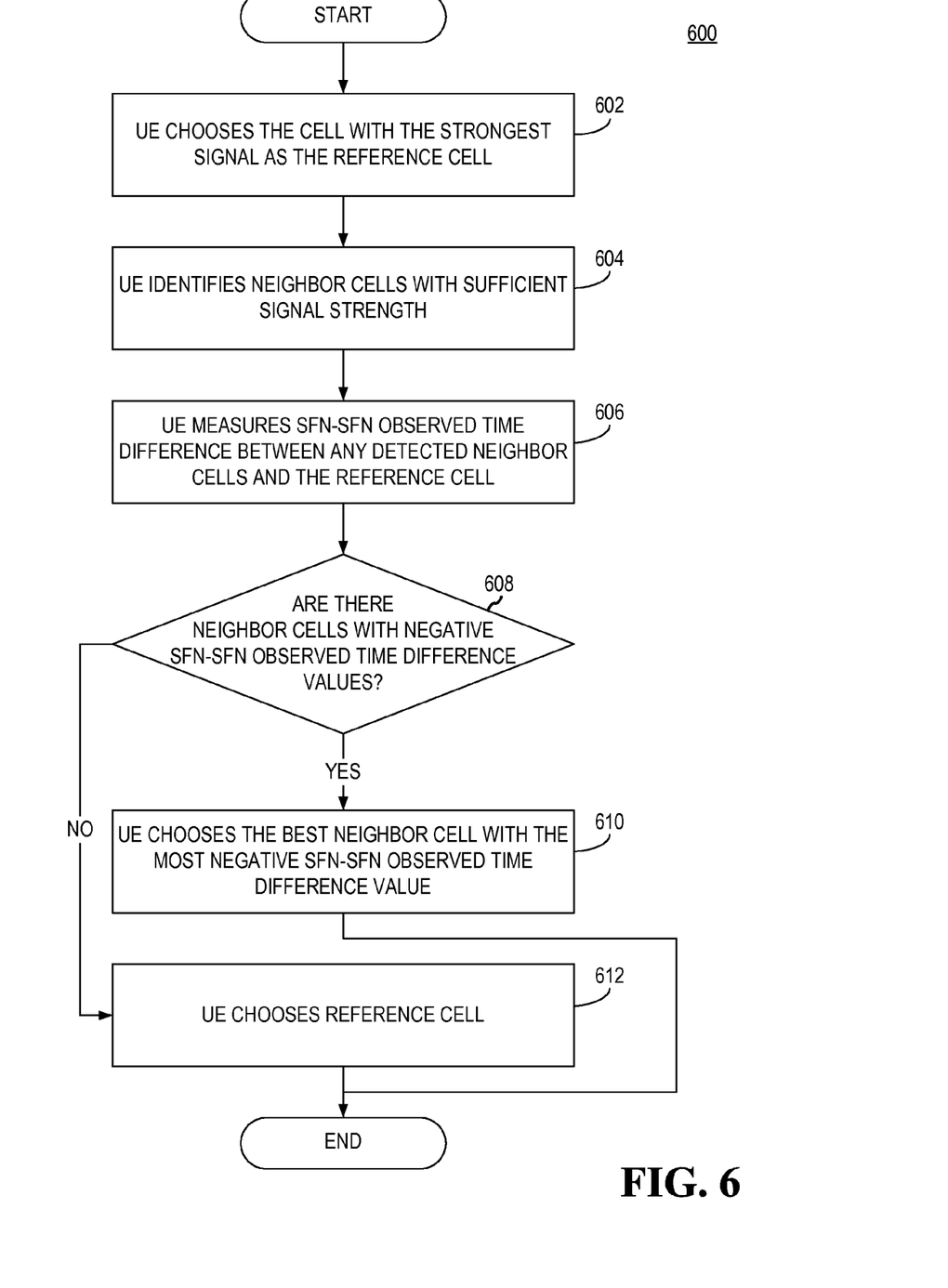
FIG. 6 is a flow diagram of a process for determining a position of a UE that assumes different Node Bs are synchronous in frame boundary transmissions in accordance with an aspect of the present disclosure.

FIG. 6 illustrates a process 600 for determining a position of a UE that assumes different Node Bs are synchronous in frame boundary transmissions where, in a step 602, the UE chooses a cell with the strongest signal as a reference cell. In one aspect of the disclosure, the signal power level is measured in terms RSCP of P-CCPCH.

In step 604, the UE identifies neighboring cells with sufficient signal strength to form a group of candidate cells that may be used to select a better cell to use as a reference cell to determine the position of the UE. By way of example, the selection criteria for cells to be added to the group of candidate cells may be:

RSCP_neighbor>Th1; or
RSCP_neighbor>RSCP_reference−Th2, where Th1 and Th2 are threshold signal power levels, and RSCP_neighbor and RSCP_reference are the RSCP values of a neighbor cell and reference cells, respectively.

In step 606, the UE may measure a system frame number (SFN)-to-SFN observed time difference between each neighbor cell found in step 604 and the reference cell. The SFN-SFN observed time difference is defined as the arrival time of a frame boundary of a neighbor cell relative to the reference cell. The SFN-SFN observed time difference is positive if the frame boundary of the neighbor cell is detected to be received later than the frame boundary of the reference cell.

In step 608, if the UE determines there are neighbor cells with negative observed time difference values, then operation continues with step 610.

In step 610, the UE chooses the neighbor cell with the most negative SFN-SFN observed time difference value. A negative value in observed time difference in step 610 indicates that the UE is closer to this neighbor cell than the reference cell when these Node Bs synchronously transmit their DL frames. The chosen neighbor cell is used to determine the UE position.

In step 612, if there is no neighbor cell with negative observed time difference values, then the reference cell is chosen.

Figure 7:
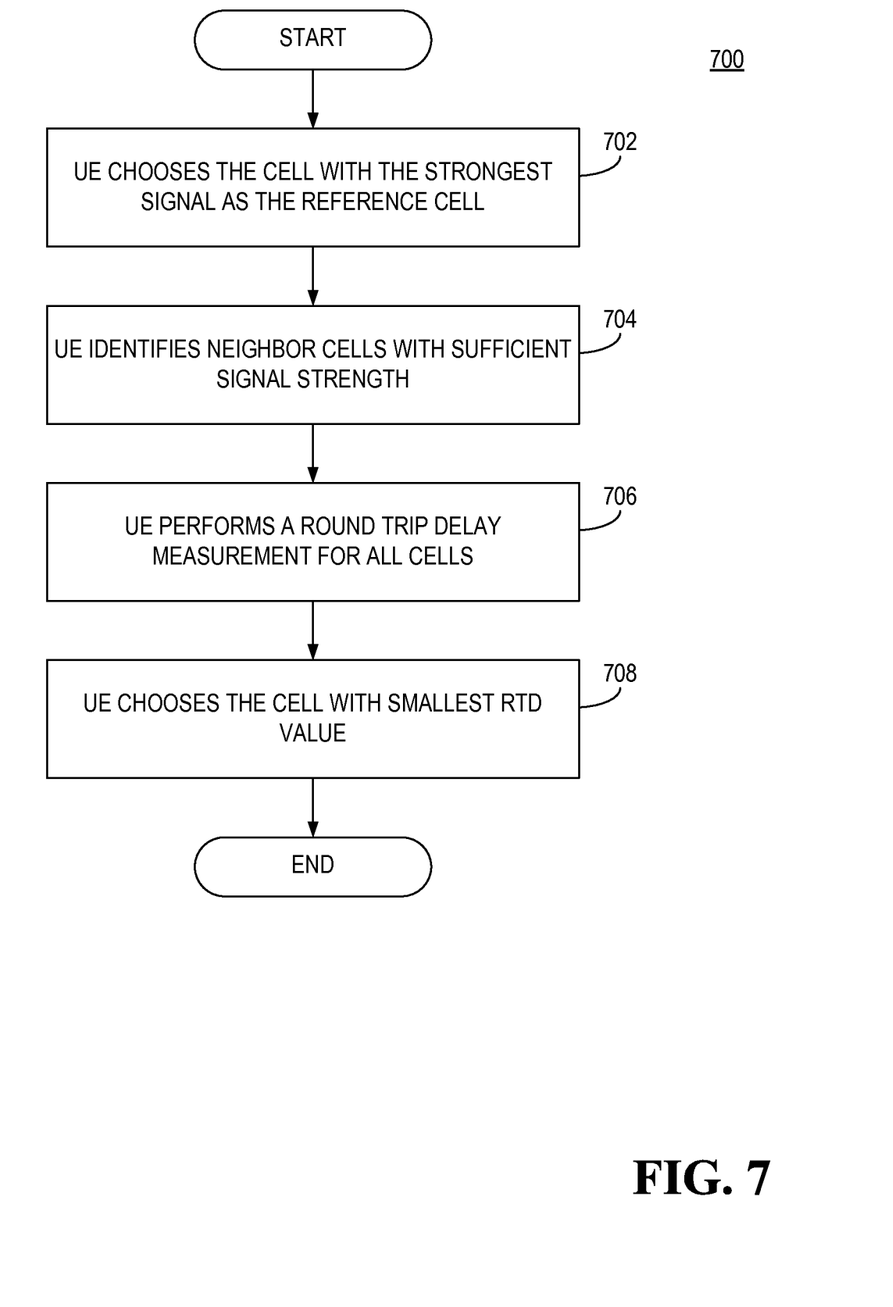
FIG. 7 is a flow diagram of a second process for determining a position of a UE that does not assume different node B's are synchronous in frame boundary transmissions in accordance with an aspect of the present disclosure.

FIG. 7 illustrates a process 700 for determining a position of a UE that does not require that different Node Bs are synchronous in frame boundary transmissions where, in a step 702, the UE chooses a cell with the strongest signal as a reference cell. In one aspect of the disclosure, the signal power level is measured in terms of RSCP of P-CCPCH.

In step 704, the UE identifies neighboring cells with sufficient signal strength. For example, it may be:

RSCP_neighbor>Th1; or
RSCP_neighbor>RSCP_reference−Th2, where Th1 and Th2 are threshold signal power levels, and RSCP_neighbor and RSCP_reference are the RSCP values of a neighbor cell and reference cells, respectively.

Figure 8:
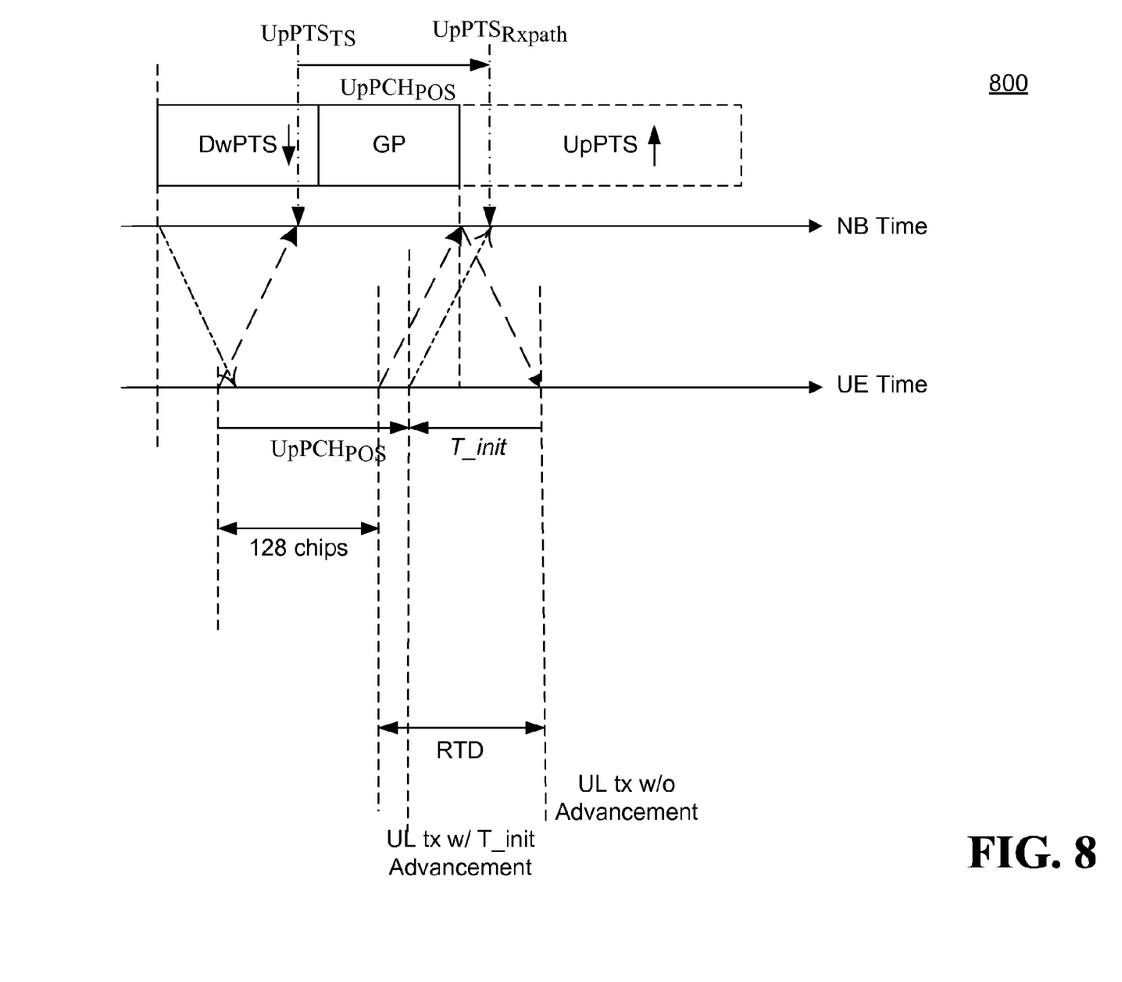
FIG. 8 is a timing diagram illustrating a round trip delay timing.

In step 706, the UE performs a round trip delay measurement for all cells. This may be achieved by sending a code such as an Uplink Synchronization (SYNC_UL) code to the Node B and receive an ACK in Fast Physical Access Channel (FPACH). The ACK includes the Received starting position of the UpPCH (UpPCH$_{POS}$) that can indicate the Round Trip Delay (RTD) such that:

$$RTD = UpPCH_{POS} - 128\ chips + T\_init,$$

where T_init is the initial time advance used for sending the SYNC_UL code. FIG. 8 includes a timing diagram 800 that illustrates the concept. Note that the 128 chips factor is because of the 96 chips of GP between the Uplink Pilot Time Slot (UpPTS) and the Downlink Pilot Time Slot (DwPTS) and 32 chips as a backoff from the beginning of GP, the zero reference timing UpPTS$_{TS}$ in the figure.

In step 708, the UE may choose the cell with smallest RTD value among the reference and neighbor cells in step 706.

Figure 9:
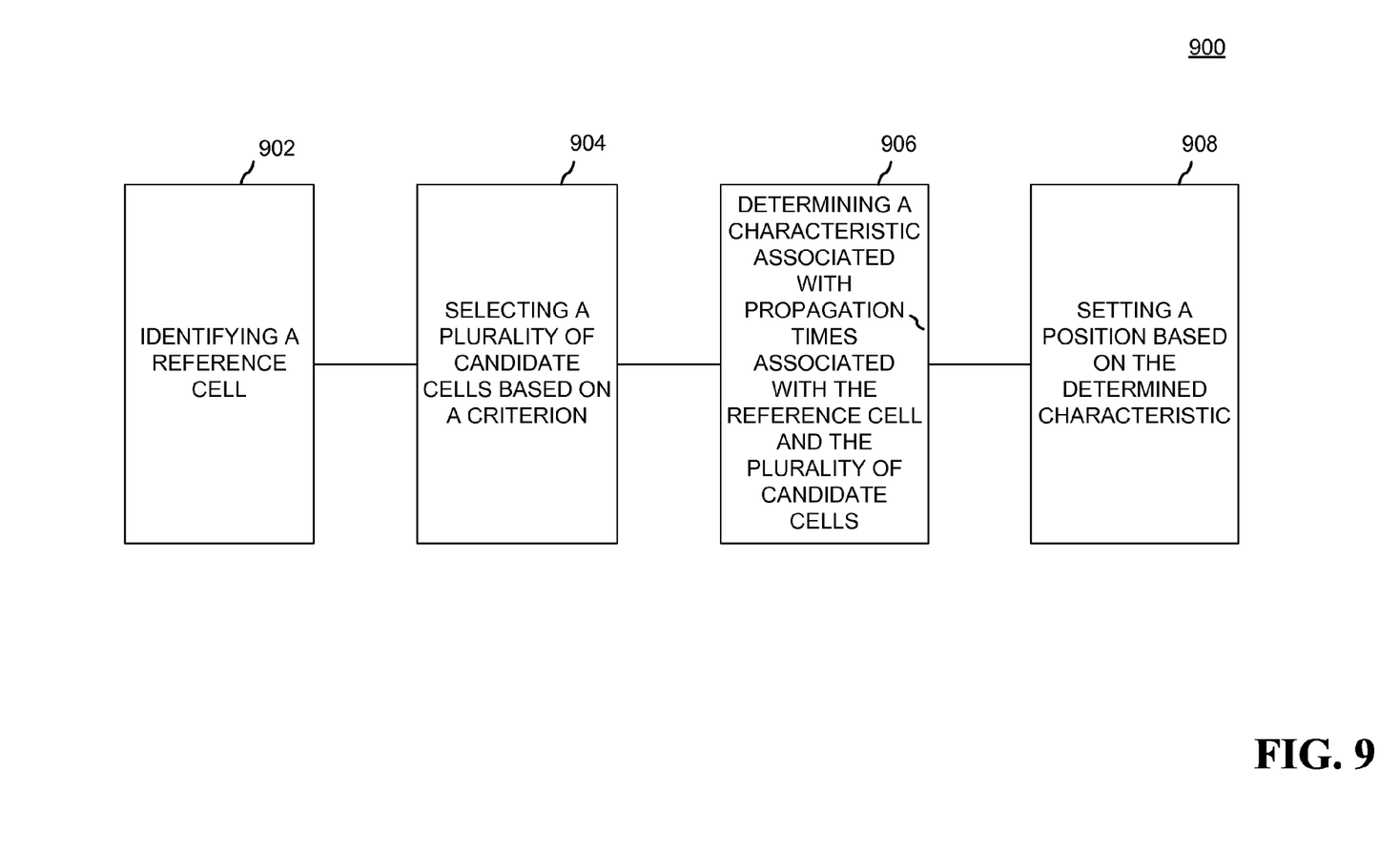
FIG. 9 is a functional block diagram conceptually illustrating example blocks executed to implement the functional characteristics of one aspect of the present disclosure.

FIG. 9 is a functional block diagram 900 illustrating example blocks executed in conducting wireless communication according to one aspect of the present disclosure. Block 902 includes identifying a reference cell. In addition, block 904 includes selecting a plurality of candidate cells based on a criterion. Furthermore, block 906 includes determining a characteristic associated with propagation times associated with both the reference cell and the plurality of candidate cells. Moreover, block 908 includes setting a position based on the determined characteristic.

In one configuration, the apparatus 350 for wireless communication includes means for identifying a reference cell; means for selecting a plurality of candidate cells based on a criterion; means for determining a characteristic associated with propagation times associated with both the reference cell and the plurality of candidate cells; and means for setting a position based on the determined characteristic. In one aspect, the aforementioned means may be the processor 390 configured to perform the functions recited by the aforementioned means. In another aspect, the aforementioned means may be a module or any apparatus configured to perform the functions recited by the aforementioned means.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
selecting a plurality of candidate neighbor cells from a plurality of cells;
determining a cell, from a reference cell and the plurality of candidate neighbor cells, that is closest to a user equipment (UE) by calculating a round trip delay for the plurality of candidate neighbor cells and the reference cell, based at least in part on a received starting position of an acknowledgement to an uplink synchronization code sent by the UE, a gap compensation factor, an initial time advance used for sending the uplink synchronization code, or a combination thereof, in which the received starting position comprises a starting position of an uplink pilot channel (UpPCHPOS); and
reporting the closest cell to a base station for position determination of the UE.

2. The method of claim 1, further comprising identifying the reference cell with a highest signal strength by measuring a Receive Signal Code Power (RSCP) of the Primary Common Control Physical Channel (P-CCPCH) for each of the plurality of cells.

3. The method of claim 1, in which selecting the plurality of candidate neighbor cells comprises selecting a neighbor cell from the plurality of cells when a signal strength of the neighbor cell is above a threshold level.

4. The method of claim 1, in which selecting the plurality of candidate neighbor cells comprises selecting a neighbor cell from the plurality of cells when a signal strength of the neighbor cell is above a threshold level subtracted from a signal strength of the reference cell.

5. A method of wireless communication, comprising:
selecting a plurality of candidate neighbor cells from a plurality of cells;
determining a cell, from a reference cell and the plurality of candidate neighbor cells, that is closest to a user equipment (UE) by:
locating a candidate neighbor cell in the plurality of candidate neighbor cells with a most negative System Frame Number-to-System Frame Number (SFN-SFN) observed time difference value, in which an SNF-SFN observed time difference indicates an arrival time of a frame boundary of a neighbor cell from the selected plurality of candidate neighbor cells relative to the reference cell; and
setting the candidate neighbor cell with the most negative SFN-SFN observed time difference value to be the closest cell; and
reporting the closest cell to a base station for position determination of the UE.

6. The method of claim 5, in which determining the closest cell further comprises:
setting the reference cell as the closest cell when there are no cells in the plurality of candidate neighbor cells having a negative SFN-SFN observed time difference value.

7. An apparatus for wireless communication, comprising:
means for selecting a plurality of candidate neighbor cells from a plurality of cells;
means for determining a cell from a reference cell and the plurality of candidate neighbor cells that is closest to a user equipment (UE) by calculating a round trip delay for the plurality of candidate neighbor cells and the reference cell, based at least in part on a received starting position of an acknowledgement to an uplink synchronization code sent by the UE, a gap compensation factor, an initial time advance used for sending the uplink synchronization code, or a combination thereof, in which the received starting position comprises a starting position of an uplink pilot channel (UpPCHPOS); and
means for reporting the closest cell to a base station for position determination of the UE.

8. The apparatus of claim 7, further comprising means for identifying the reference cell with a highest signal strength by measuring a Receive Signal Code Power (RSCP) of the Primary Common Control Physical Channel (P-CCPCH) for each of the plurality of cells.

9. The apparatus of claim 7, in which the means for selecting the plurality of candidate neighbor cells comprises means for selecting a neighbor cell from the plurality of cells when a signal strength of the neighbor cell is above a first threshold level.

10. The apparatus of claim 9, in which the means for selecting the plurality of candidate neighbor cells comprises means for selecting a neighbor cell from the plurality of cells when a signal strength of the neighbor cell is above a second threshold level subtracted from a signal strength of the reference cell.

11. An apparatus for wireless communication, comprising:
a memory; and
at least one processor coupled to the memory and configured:
to select a plurality of candidate neighbor cells from a plurality of cells;
to determine a cell, from a reference cell and the plurality of candidate neighbor cells, that is closest to a user equipment (UE) by calculating a round trip delay for the plurality of candidate neighbor cells and the reference cell, based at least in part on a received starting position of an acknowledgement to an uplink synchronization code sent by the UE, a gap compensation factor, an initial time advance used for sending the uplink synchronization code, or a combination thereof, in which the received starting position comprises a starting position of an uplink pilot channel (UpPCHPOS); and
to report the closest cell to a base station for position determination of the UE.

12. The apparatus of claim 11, in which the at least one processor is further configured to identify the reference cell with a highest signal strength by measuring a Receive Signal Code Power (RSCP) of the Primary Common Control Physical Channel (P-CCPCH) for each of the plurality of cells.

13. The apparatus of claim 11, in which the at least one processor is further configured to select the plurality of candidate neighbor cells by selecting a neighbor cell from the plurality of cells when a signal strength of the neighbor cell is above a threshold level.

14. The apparatus of claim 11, in which the at least one processor is further configured to select the plurality of candidate neighbor cells by selecting a neighbor cell from the plurality of cells when a signal strength of the neighbor cell is above a threshold level subtracted from a signal strength of the reference cell.

15. An apparatus for wireless communication, comprising:
a memory; and
at least one processor coupled to the memory and configured:
to select a plurality of candidate neighbor cells from a plurality of cells;
to determining a cell, from a reference cell and the plurality of candidate neighbor cells, that is closest to a user equipment (UE) by:
locating a candidate neighbor cell in the plurality of candidate neighbor cells with a most negative System Frame Number-to-System Frame Number (SFN-SFN) observed time difference value, in which an SNF-SFN observed time difference indicates an arrival time of a frame boundary of a neighbor cell from the selected plurality of candidate neighbor cells relative to the reference cell; and
setting the candidate neighbor cell with the most negative SFN-SFN observed time difference value to be the closest cell; and
to report the closest cell to a base station for position determination of the UE.

16. The apparatus of claim 15, in which the at least one processor is further configured to determine the closest cell by:
setting the reference cell as the closest cell when there are no cells in the plurality of candidate neighbor cells having a negative SFN-SFN observed time difference value.

17. A computer program product, comprising:
a non-transitory computer-readable medium having program code recorded thereon, the program code comprising:
program code to select a plurality of candidate neighbor cells from a plurality of cells;
program code to determine a cell, from a reference cell and the plurality of candidate neighbor cells, that is closest to a user equipment (UE) by calculating a round trip delay for the plurality of candidate neighbor cells and the reference cell, based at least in part on a received starting position of an acknowledgement to an uplink synchronization code sent by the UE, a gap compensation factor, an initial time advance used for sending the uplink synchronization code, or a combination thereof, wherein the received starting position comprises a starting position of an uplink pilot channel (UpPCHpos); and
program code to report the closest cell to a base station for position determination of the UE.

18. The computer program product of claim 17, further comprising program code to identify the reference cell with a highest signal strength by measuring a Receive Signal Code Power (RSCP) of the Primary Common Control Physical Channel (P-CCPCH) for each of the plurality of cells.

19. The computer program product of claim 17, in which the program code to select the plurality of candidate neighbor cells comprises program code to select a neighbor cell from the plurality of cells when a signal strength of the neighbor cell is above a threshold level.

20. The computer program product of claim 17, in which the program code to select the plurality of candidate neighbor cells comprises program code to select a neighbor cell from the plurality of cells when a signal strength of the neighbor cell is above a threshold level subtracted from a signal strength of the reference cell.

* * * * *